(12) United States Patent
Hayashi et al.

(10) Patent No.: US 8,483,032 B2
(45) Date of Patent: Jul. 9, 2013

(54) OPTICAL PICKUP DEVICE

(75) Inventors: Soutaro Hayashi, Osaka (JP); Fumiaki Mori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/574,187

(22) Filed: Oct. 6, 2009

(65) Prior Publication Data

US 2010/0091635 A1    Apr. 15, 2010

(30) Foreign Application Priority Data

Oct. 14, 2008    (JP) ................. 2008-264841

(51) Int. Cl.
*G11B 7/00* (2006.01)
*G11B 7/135* (2006.01)

(52) U.S. Cl.
USPC .................. 369/112.23; 369/44.21; 369/44.22

(58) Field of Classification Search
USPC ........ 369/30.34, 44.15, 44.21, 44.22, 112.08, 369/112.13, 112.2, 112.23, 112.26
See application file for complete search history.

(56) References Cited

U.S. PATENT DOCUMENTS

| | | | | |
|---|---|---|---|---|
| 5,787,067 | A * | 7/1998 | Song | 720/687 |
| 2004/0111734 | A1 * | 6/2004 | Terashima | 720/671 |
| 2005/0276207 | A1 * | 12/2005 | Oka et al. | 369/112.23 |
| 2007/0014206 | A1 * | 1/2007 | Boku et al. | 369/44.23 |
| 2007/0157231 | A1 | 7/2007 | Eldering et al. | 725/35 |
| 2007/0230310 | A1 * | 10/2007 | Moriyama et al. | 369/112.01 |
| 2008/0068960 | A1 * | 3/2008 | Hosoda et al. | 369/53.19 |

FOREIGN PATENT DOCUMENTS

| | | |
|---|---|---|
| JP | 2001-209956 A | 8/2001 |
| JP | 2001-297478 A | 10/2003 |
| JP | 2005-317060 | 11/2005 |
| JP | 2007-048365 | 2/2007 |
| JP | 2007-157231 | 6/2007 |
| JP | 2007-265572 | 10/2007 |
| JP | 2007-305179 | 11/2007 |
| JP | 2008-016090 | 1/2008 |

* cited by examiner

*Primary Examiner* — Aneeta Yodichkas

(74) *Attorney, Agent, or Firm* — Morgan, Lewis & Bockius LLP

(57) ABSTRACT

An optical pickup device is provided with: a light source; an objective lens focusing light from the light source on an information recording surface of an optical recording medium; a lens holder holding the objective lens; and a collision prevention member provided on the lens holder, and preventing collision between the optical recording medium and the objective lens. The collision prevention member is formed with a sheet member, and is disposed on the lens holder so that a side surface, substantially parallel to a thickness direction, of the sheet member faces the information recording surface.

3 Claims, 5 Drawing Sheets

TRACKING DIRECTION (RADIUS DIRECTION)

ROTATION DIRECTION OF OPTICAL DISC

OPTICAL PICKUP DEVICE

This application is based on Japanese Patent Application No. 2008-264841 filed on Oct. 14, 2008, the contents of which are hereby incorporated by reference.

BACKGROUND OF THE INVENTION

1. Field of the Invention

The present invention relates to an optical pickup device, and more particularly, to an optical pickup device provided with a collision prevention member preventing collision between an objective lens focusing light from a light source on an information recording surface of an optical recording medium and the optical recording medium.

2. Description of Related Art

Optical recording media such as a compact disc (hereinafter, referred to as CD) and a digital versatile disc (hereinafter, referred to as DVD) are widely spread. Moreover, recently, a blue-ray disc (hereinafter, referred to as BD) on which a large amount of information can be recorded has been put into practical use. When information is read from and written in the optical recording medium as described above, an optical pickup device is used. The optical pickup device is provided with an objective lens focusing light emitted from a light source on an information recording surface of an optical recording medium, and a light receiving portion receiving return light that is reflected on the information recording surface.

In order for the optical pickup device to read and write information, it is necessary to control a focal position of the objective lens so that, regardless of wobbling of an optical recording medium or the like, light emitted from the light source focuses on the information recording surface of the optical recording medium at all times. Accordingly, conventionally, control is performed whereby the objective lens is held by a lens holder, and the lens holder is moved in a direction close to and away from the optical recording medium by an actuator, so that a positional relationship between the objective lens and the optical recording medium is constant at all times. Hereinafter, this control is referred to as focus servo control.

On the optical recording medium, like the aforementioned BD, on which a large amount of information can be recorded, information is recorded with high density. Accordingly, in order for the optical pickup device to perform reading of information and the like, it is necessary to decrease the size of a light spot formed on the optical recording medium. Conventionally, as a method of decreasing the size of a light spot, a wavelength of light emitted from a light source is decreased, and a numerical aperture of the objective lens is increased.

As the numerical aperture of the objective lens is increased, a distance from the tip end of the objective lens to the optical recording medium (working distance; WD) tends to be decreased when the optical pickup device is operated. With the optical pickup device compatible with the BD in particular, the WD tends to be decreased. With the WD so decreased, for example, in cases where an optical recording medium whose surface greatly wobbles is used, and where the focus servo control cannot be performed owing to a flaw on an optical recording medium, vibration from the outside or the like, there is an extremely strong possibility that the objective lens and the recording medium may collide with each other.

A condition leading to a decreased WD is not only encountered by the optical pickup device compatible with the BD but may also be encountered by the optical pickup device compatible with the optical recording media such as CD and DVD. Specifically, in a notebook personal computer and the like that need to be slim, an objective lens provided in the optical pickup device has to be small in diameter. Even in a case, like this, where the objective lens having a small diameter is used, the WD is decreased, yielding an extremely strong possibility that the objective lens and the optical recording medium may collide with each other.

Thus, conventionally, the optical pickup device is provided with a collision prevention member for preventing collision between the objective lens and the optical recording medium (e.g., see Patent Documents 1 and 2). This helps prevent situations, owing to collision between the objective lens and the optical recording medium, where no information recorded on the optical recording medium can be used, and where the optical pickup device cannot be used with its objective lens damaged.

A friction force produced by the collision prevention member when making contact with the optical recording medium needs to be small. This is because the collision prevention member should not damage the optical recording medium when colliding with it. For that, conventionally, the collision prevention member is processed such that a tip end thereof is formed into a spherical surface, helping reduce an area of the contact with the optical recording medium (e.g., see Patent Document 1). As another method of reducing a friction force produced by the contact, a protruding member protruding from the objective lens, at a tip end thereof, is coated with a low friction material such as fluoroplastic resin, polyimide material and the like (e.g., see Patent Document 1 and 2).

However, formation of a coating film that helps reduce a friction force produced by the collision necessitates preparation of a protruding member and a material with a composition specialized for coating. This disadvantageously leads to an increase in cost necessary for preventing the collision between the objective lens and the optical recording medium.

Moreover, the collision prevention member needs to have wear resistance as its property for coping with the collision with the optical recording medium. However, by selecting a hard-to-wear material (material having wear resistance) as a material of the collision prevention member, difficulty is increased in processing a spherical surface like that mentioned above. Accordingly, so long as a molded article as disclosed, for example, by Patent Document 1 is used as the collision prevention member, it is impossible to secure wear resistance satisfactorily, causing the collision prevention member to wear out when colliding with the optical recording medium with a possibility that the optical recording medium may be stained. Moreover, when the collision prevention member wears out, and the recording medium is stained accordingly, quality of information reading or the like is disadvantageously degraded.

[Patent Document 1] JP-A-2001-209956
[Patent Document 2] JP-A-2001-297478

SUMMARY OF THE INVENTION

In light of the foregoing, an object of the present invention is to provide an optical pickup device with which it is possible to realize prevention of collision between an objective lens and an optical recording medium at low cost, and with which the optical recording medium, when colliding with the collision prevention member, is hardly damaged and hardly stained by the collision prevention member.

To achieve this object, an optical pickup device according to the present invention includes: a light source; an objective lens focusing light from the light source on an information recording surface of an optical recording medium; a lens holder holding the objective lens; and a collision prevention member provided on the lens holder and preventing collision between the objective lens and the optical recording medium; wherein the collision prevention member is formed with a sheet member, and is disposed on the lens holder so that a side surface, substantially parallel to a thickness direction, of the sheet member faces the information recording medium.

With this arrangement, the side surface, substantially parallel to the thickness direction, of the sheet member is so formed as to face the information recording surface of the optical recording medium. Thus, even in a case where the sheet member is used as the collision prevention member, it is possible to reduce a contact area between the collision prevention member and the optical recording medium. This helps reduce a friction force produced by contact between the collision prevention member and the optical recording medium, and hence helps reduce a possibility that the optical recording medium may be damaged. Moreover, the collision prevention member is formed in the form of a sheet member, facilitating selection of a wear-resistance material as a material of the collision prevention member. This makes it possible to reduce a possibility that the collision prevention member may wear out by making contact with the optical recording medium, which may further cause the optical recording medium to be stained.

In the optical pickup device arranged as described above, preferably the collision prevention member is disposed on the lens holder so that the thickness direction thereof is substantially parallel to a rotation direction of the optical recording medium, relative to a position at which the collision prevention member is disposed. With this arrangement, it is possible to reduce a time for which a collision point on the optical recording medium is in contact with the collision prevention member, and hence to reduce a friction force produced by collision between the collision prevention member and the optical recording medium. That is, it is possible to reduce a possibility that contact between the collision prevention member and the optical recording medium may give a flaw or the like to the optical recording medium.

Moreover, in the optical pickup device arranged as described above, preferably the lens holder is formed with a fixing portion permitting the collision prevention member to be inserted and firmly fitted therein. With this arrangement, the sheet-formed collision prevention member is fixedly mounted on the lens holder easily, leading to improved operability in mounting the collision prevention member on the lens holder. Moreover, height management is easily performed when the collision prevention member is mounted on the lens holder, compared with a case where it is fixed on the lens holder using a sticky material, thus helping reduce cost. Incidentally, so long as the fixing portion is formed integrally with the lens holder, provision of the fixing portion hardly incurs additional cost.

Moreover, in the optical pickup device arranged as described above, preferably the fixing portion, at a side surface thereof, is formed with a cutout portion for making the collision prevention member adhering and thus securely fixed to the fixing portion. With this arrangement, it is possible to securely fix the collision prevention member to the fixing portion with easy operation.

With the optical pickup device according to the present invention, it is possible to realize prevention of collision between an objective lens and an optical recording medium at low cost. Moreover, with the optical pickup device according to the present invention, it is possible to reduce a possibility that the collision prevention member, when colliding with the optical recording medium, may damage and stain the optical recording medium.

DETAILED DESCRIPTION OF PREFERRED EMBODIMENTS

Hereinafter, an embodiment of an optical pickup device embodying the present invention will be described with reference to the accompanying drawings.

Figure 1:
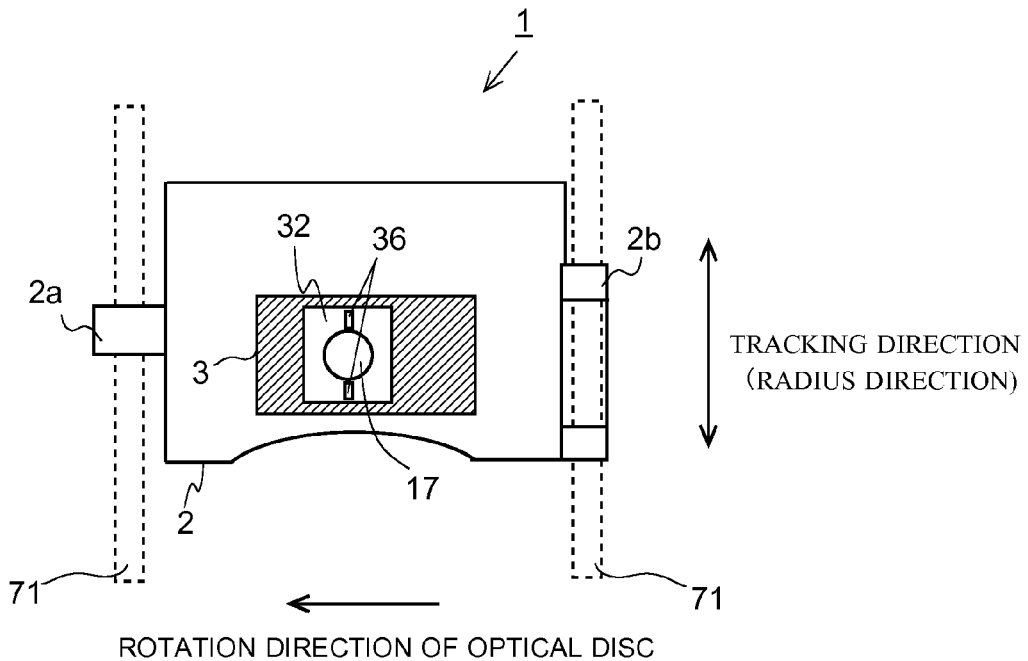
FIG. 1 is a plan view schematically showing a structure of an optical pickup device embodying the present invention.
Figure 2:
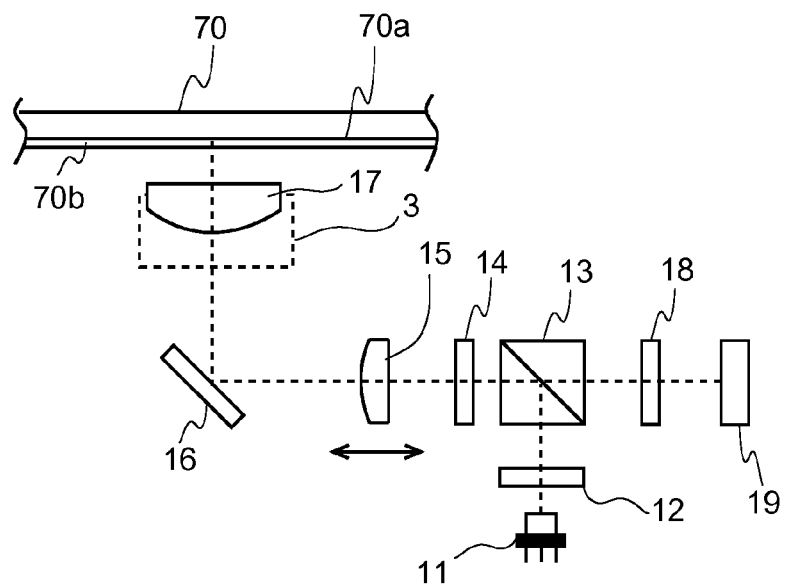
FIG. 2 schematically shows a structure of an optical system inside the optical pickup device embodying the present invention.
Figure 3A:
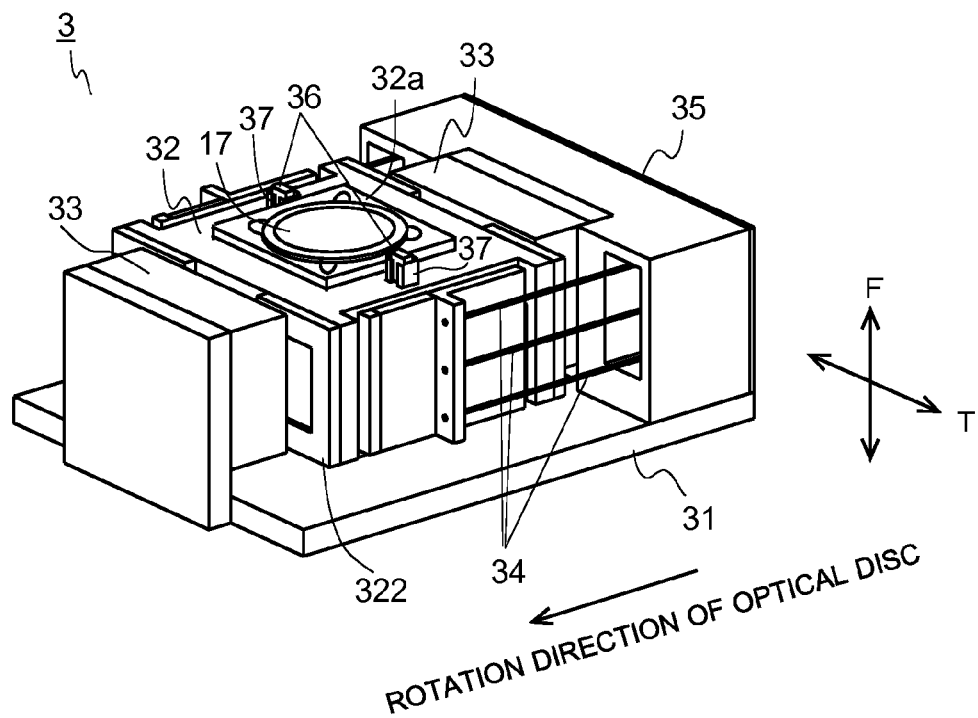
FIG. 3A is a perspective view schematically showing an entire structure of an objective lens actuator provided in the optical pickup device embodying the present invention.
Figure 3B:
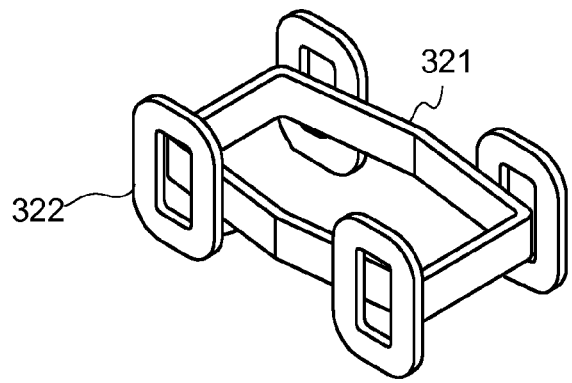
FIG. 3B is a perspective view schematically showing a structure of a coil provided in the objective lens actuator embodying the present invention.

First, an outline of a structure of the optical pickup device according to this embodiment will be described with reference to FIGS. 1, 2, 3A and 3B. FIG. 1 is a plan view schematically showing a structure of the optical pickup device embodying the present invention. FIG. 2 schematically shows a structure of an optical system provided in the optical pickup device embodying the present invention. FIG. 3A is a perspective view schematically showing an entire structure of an objective lens actuator provided in the optical pickup device embodying the present invention; FIG. 3B is a perspective view schematically showing a structure of a coil provided in the objective lens actuator embodying the present invention.

As shown in FIG. 1, the optical pickup device 1 according to this embodiment is provided with a slider base 2. The slider base 2 is provided with two supporting portions 2a and 2b of different kinds. The slider base 2 is slidably supported on two guide shafts 71, with the shaft supporting portions 2a and 2b, that extend in a radius direction of an optical disc (unillustrated), thereby making the optical pickup device 1 movable in the radius direction. Note that the slider base 2 is moved by an unillustrated publicly known moving mechanism. Such a publicly known moving mechanism includes an arrangement in which a rack fitted on the slider base 2 and a pinion rotated by a motor are used.

On the slider base 2, an optical system as shown in FIG. 2 is mounted. That is, on the slider base 2, there are mounted a light source 11, a diffraction element 12, a polarizing beam splitter 13, a quarter-wave plate 14, a collimator lens 15, a deflection mirror 16, an objective lens 17, a cylindrical lens 18, and a photodetector 19. Note that the objective lens 17 is mounted on the slider base 2 with its being mounted on the objective lens actuator 3.

The light source 11 is composed of a semiconductor laser, and since the optical pickup device 1 according to this embodiment is compatible with a BD (example of the optical recording medium), a semiconductor laser emitting a laser beam having a wavelength of 405 nm is used. A wavelength of light emitted from the semiconductor laser is varied as necessary depending on the kind of an optical disc handled by the optical pickup device. The diffraction element 12 divides a laser beam emitted from the light source 11 into a principal ray and two secondary rays. The reason that the light from the light source 11 is divided into three different rays is that signals necessary for performing servo control are obtained.

The polarizing beam splitter 13, working together with the quarter-wave plate 14, functions as an optical isolator. Specifically, the polarizing beam splitter 13 reflects a laser beam from the light source 11 so as to direct it toward the optical disc 70, but transmits return light reflected by the optical disc 70 so as to direct it toward the photodetector 19.

The collimator lens 15 is a lens, when placed at a proper position, capable of transforming an incoming laser beam into a parallel light beam. Note that in the optical pickup device 1 according to this embodiment, the collimator lens 15 is made movable in an optical axis direction (the direction indicated by left and right arrow in FIG. 2). Accordingly, the laser beam emitted from the light source 11 and then passing through the collimator lens 15 is not necessarily a parallel light beam; it may be a converged or diverged light beam. The reason for making a position of the collimator lens 15 thus adjustable is to adjust the degree of convergence or divergence of a laser beam incident on the objective lens 17 by moving the position of the collimator lens 15, so as to correct spherical aberration.

A technique according to which the collimator lens 15 is moved in the optical axis direction may adopt a publicly known arrangement. Examples of such an arrangement include one in which a movable holder holding the collimator lens 15 is moved by use of a motor and a lead screw (neither shown in the figures) along a guide shaft extending in the optical axis direction.

The deflection mirror 16 reflects a laser beam transmitted from the collimator lens 15. Thus, a laser beam emitted from the light source 11 has its advancing direction bent, and then further advances in a direction perpendicular to an information recording surface 70*a* of the optical disc 70.

The objective lens 17 focuses the laser beam, which is transmitted from the deflection mirror 16, on the information recording surface 70*a* of the optical disc 70. As described above, the objective lens 17 is mounted on the objective lens actuator 3. With the objective lens actuator 3, the objective lens 17 is made movable in a direction close to and away from the optical disc 70 (up and down directions in FIG. 2), namely in a focusing direction, and in a direction parallel to the radius direction of the optical disc 70 (transverse direction on the paper of FIG. 2), namely in a tracking direction.

With reference to FIGS. 3A and 3B, a structure of the objective lens actuator 3 provided in the optical pickup device 1 will be described. The objective lens actuator 3 is provided with an act base 31, and a lens holder 32 holding the objective lens 17. On the act base 31, a pair of permanent magnets 33 are placed upright so that they are arranged symmetrically with the lens holder 32 in between. The act base 31 is formed with an optical path hole (unillustrated) through which a laser beam reflected by the deflection mirror 16 is directed to the objective lens 17.

The lens holder 32 is formed with: a lens holding portion 32*a* for holding the objective lens 17; and a plurality of fixing portions 37 for fixedly mounting corresponding collision prevention members 36, which will be described later. Moreover, three wires 34 on one side, totally six wires 34 on both sides, at one end thereof, are attached to the lens holder 32. The other end of the wires 34 are fixed to a circuit board 35 placed upright on the act base 31, and thereby the lens holder 32 is in a state movably supported by the wires 34.

Furthermore, the lens holder 32 is provided with: a focusing coil 321 so arranged as to surround an optical axis of the objective lens 17 along inner side walls of the lens holder 32; and four tracking coils 322 arranged symmetrically at positions of outer side walls (walls facing the permanent magnets 33) of the lens holder 32 so that two tracking coils 322 are provided for each side. These coils 321 and 322 are fed with electric current via the wires 34.

When the focusing coil 321 is fed with electric current, electromagnetic effect is caused by a magnetic field formed by the permanent magnets 33 and the electric current passing through the focusing coil 321, and the objective lens 17 is moved together with the lens holder 32 in the focusing direction F according to the direction and the magnitude of the electric current passing through the coil 321. Likewise, when the tracking coils 322 are fed with the electric current, the objective lens 17 is moved together with the lens holder 32 in the tracking direction T according to a direction and a magnitude of the electric current.

With reference back to FIG. 2, the return light reflected by the information recording layer 70*a* is made to pass through, in the order of, the objective lens 17, the deflection mirror 16, the collimator lens 15, the quarter-wave plate 14, and the polarizing beam splitter 13, and then reaches the cylindrical lens 18. The cylindrical lens 18 applies astigmatism to a laser beam incident thereon. The reason for applying astigmatism by the cylindrical lens 18 is to obtain a signal necessary for performing the servo control.

The laser beam, to which astigmatism is applied by the cylindrical lens 18, focuses on a light receiving area of the photodetector 19. The photodetector 19 converts an optical signal received by the light receiving area into an electrical signal so as to output it. Then, processing is performed on electrical signals outputted from the photodetector 19 whereby, for example, a play back signal, a focus error signal, a tracking error signal, and the like are produced.

The objective lens actuator 3 is controlled based on the focus error signal and the tracking error signal, whereby servo control, including focus servo control and tracking servo control, is performed. As described above, the focus servo control denotes control performed such that the positional relationship between the objective lens 17 and the optical disc 70 is constant at all times. On the other hand, the tracking servo control denotes control performed such that a light spot, created by focusing the light incident on the objective lens 17, is at all times made to follow a track formed on the optical disc 70.

The outline of the structure of the optical pickup device 1 according to this embodiment has been described. The optical pickup device 1 according to this embodiment is characterized by an arrangement with which collision between the objective lens 17 and the optical disc 70 is prevented, which will be described in detail below.

In the optical pickup device 1, a plurality of collision prevention members 36 are provided on the lens holder 32 of the objective lens actuator 3, whereby it is possible to prevent collision between the objective lens 17 and the optical disc 70 (e.g., see FIG. 3A). More specifically, the optical pickup device 1 is provided with two collision prevention members 36. As shown in FIGS. 1 and 3A, the two collision prevention members 36 are arranged substantially symmetrically in the tracking direction with the objective lens 17 in between.

Figure 4:
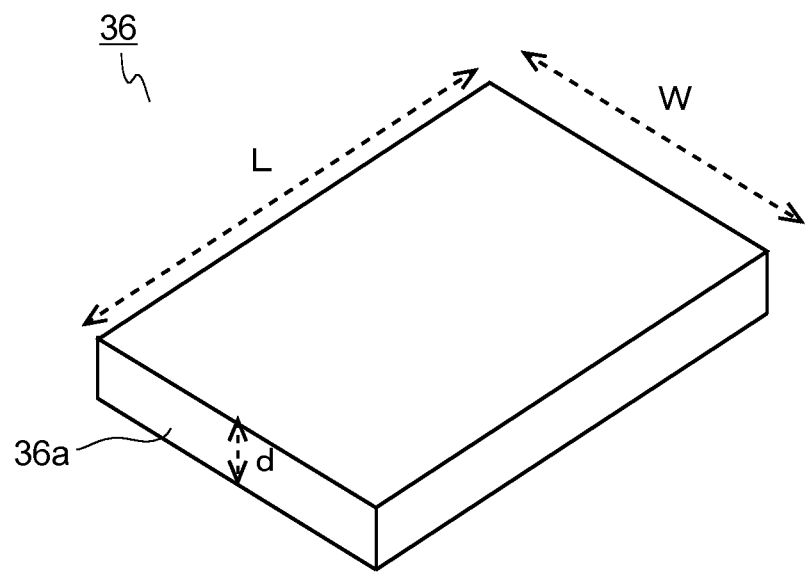
FIG. 4 is a perspective view schematically showing a shape of a collision prevention member provided in the optical pickup device embodying the present invention.

FIG. 4 is a perspective view schematically showing a shape of the collision prevention member 36 provided in the optical pickup device 1. As shown in FIG. 4, the collision prevention member 36 provided in the optical pickup device 1 is formed with a sheet member. The sheet member with which the collision prevention member 36 is formed is preferably made of a material that produces as few flaws and stains as possible when colliding with the optical disc 70. Specifically, for example, it is preferable that the material be softer than a protective layer 70b (see FIG. 2; a layer protecting the information recording surface 70a) of the optical disc 70 that is formed of polycarbonate or the like. Moreover, it is preferable that the material have wear resistance so that it is hardly shaved when colliding with the optical disc 70. Examples of the material having such properties include ultra-high-molecular-weight-polyethylene (UHMW-PE). In this embodiment, as the sheet member with which the collision prevention member 36 is formed, ultra-high-molecular-weight-polyethylene is used.

The collision prevention members 36 are arranged so that side surfaces 36a thereof substantially parallel to a thickness direction d are made to face the information recording surface 70a of the optical disc 70 (in other words, a front surface of the optical disc 70). That is, the collision prevention members 36 are disposed on the lens holder 32 so that the sheet members are placed upright with a longitudinal direction L thereof arranged parallel to the up and down directions. So that the objective lens 17 and the optical disc 70 do not collide with each other, the sheet members are made higher, in the longitudinal direction L, than the objective lens 17 as measured at a tip end thereof.

Figure 5:
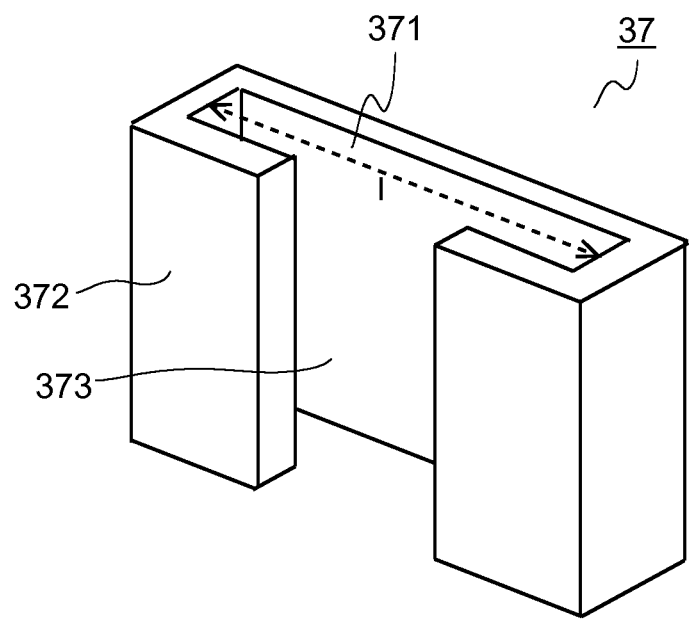
FIG. 5 is a perspective view schematically showing a structure of a fixing portion formed on a lens holder provided in the optical pickup device embodying the present invention.

The lens holder 32 is formed with a plurality of fixing portions 37 each permitting the sheet-formed collision prevention member 36 to be inserted and firmly fitted therein, so that the collision prevention members 36 can be securely fixed in the upright state as described above. FIG. 5 is a perspective view schematically showing a structure of the fixing portion 37 formed on the lens holder 32. As shown in FIG. 5, the fixing portions 37 are each provided with an insertion hole 371 formed in a rectangular parallelepiped shape for inserting the sheet-formed collision prevention member 36 therein, and a cutout slot 373 formed by cutting out part of a side surface 372.

In the optical pickup device 1 according to this embodiment, the fixing portions 37 are formed integrally with the lens holder 32. As described above, the two collision prevention members 36 are provided, and accordingly two fixing portions 37 are provided; the two fixing portions 37 are arranged substantially symmetrically in the tracking direction T with the lens holding portion 32a in between (see FIGS. 1 and 3A). The fixing portions 37 are disposed with a longitudinal direction l of the insertion holes 371 thereof (see FIG. 5) arranged to be parallel to the tracking direction, and the cutout slot 373 is formed in a side surface of the fixing portion 37 parallel to the tracking direction (see FIG. 3A).

Figure 6:
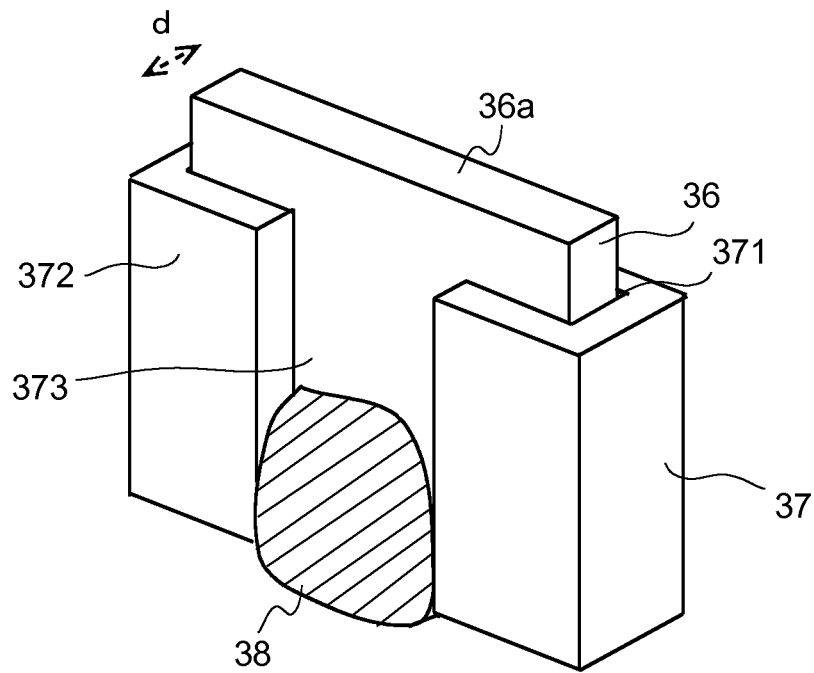
FIG. 6 is perspective view schematically showing the collision prevention member inserted and firmly fixed in the fixing portion of the optical pickup device embodying the present invention.

FIG. 6 is a perspective view schematically showing the collision prevention member 36 inserted in and securely fixed to the fixing portion 37 of the optical pickup device 1 according to this embodiment. As described above, the collision prevention members 36 are each inserted in the insertion hole 371 of the fixing portion 37, in the upright state with the side surface 36a, substantially parallel to the thickness direction d, of the member 36 facing the optical disc 70. Meanwhile, since the longitudinal direction l of the insertion holes 371 is parallel to the tracking direction, the thickness direction d of the sheet-formed collision prevention members 36 thus inserted in the insertion holes 371 is parallel to a rotation direction (see FIGS. 1 and 3A) of the optical disc 70, as observed relative to positions at which the collision prevention members 36 are disposed. When the collision prevention member 36 is inserted in the insertion hole 371, an adhesive agent 38 is then injected at the side of a lower portion of the cutout slot 373, with the collision prevention member 36 pressed by a jig from the side of an upper portion thereof, or from the side of the upper portion and the side of a side surface thereof, so that the collision prevention members 36 are securely fixed.

As the adhesive agent, for example, a UV adhesive agent that is hardened by being irradiated with UV, and the like is used. The reason for fixing the collision prevention members 36 while pressing it by a jig is to reduce variation in a height direction of the collision prevention members 36. Meanwhile, pressing the collision prevention members 36 from the upper portions thereof alone is sufficient; however, it is more preferable that the collision prevention members 36 be pressed by a jig not only from the side of the upper portions thereof but also from the side of the side surfaces (e.g., using the cutout slots 373) in consideration of a possibility that they might fall, and the like. Moreover, from the viewpoint of improved operability, it is preferable that the collision prevention members 36 be fitted into the fixing portions 37 before the wires 34 are attached to the lens holder 32.

Figure 7:
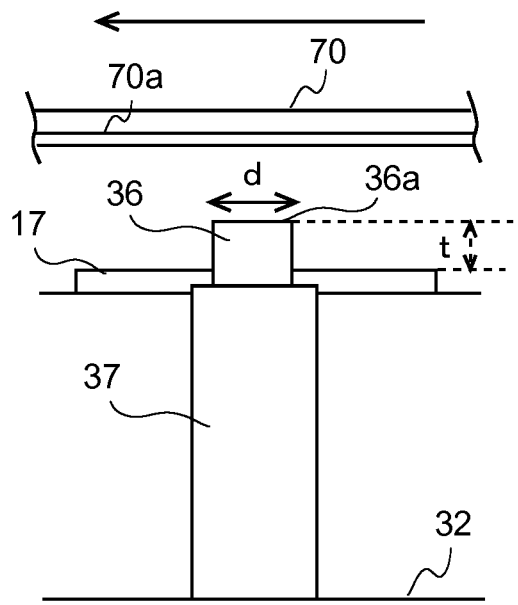
FIG. 7 is a side surface view of the collision prevention member fixed in the fixing portion as seen in a tracking direction.

Next, advantages offered by disposing the collision preventing members 36 on the lens holder 32 as described above will be described with reference to FIG. 7. FIG. 7 is a side surface view of the collision prevention member 36 firmly fitted in the fixing portion 37 as seen in the tracking direction. FIG. 7 shows the collision prevention member 36 together with the optical disc 70 so as to facilitate understanding a positional relationship therebetween.

As shown in FIG. 7, the collision prevention members 36 disposed on the lens holder 32 are made higher than the objective lens 17, as measured at the tip end thereof, by a predetermined height t. Thus, with the collision prevention members 36, it is possible to prevent collision between the objective lens 17 and the optical disc 70. On the other hand, the collision members 36 may collide with the optical disc 70. However, the collision prevention members 36 are each formed with the sheet member, and are in a relationship with the optical disc 70 in which the side surface, substantially parallel to the thickness direction d, of the sheet member faces the information recording surface 70a of the optical disc 70, and in which the thickness direction d of the sheet member is substantially parallel to the rotation direction of the optical disc 70; in this case, a collision area between the two is reduced, and a time for which the collision point on the optical disc 70 is in contact with the collision prevention members 36 (contact time) is reduced. Thus, it is possible to reduce a dynamic friction force produced by the collision between the collision prevention members 36 and the optical disc 70. This helps reduce a possibility that contact between the collision prevention members 36 and the optical disc 70 may lead to the optical disc 70 damaged. Moreover, the collision prevention members 36 are formed of a material having wear resistance, helping reduce a possibility that contact between the collision prevention members 36 and the optical disc 70 may lead to the optical disc 70 stained.

In the foregoing, it is stated that the collision area between the two is reduced, and that the time for which the collision point on the optical disc 70 is in contact with the collision prevention members 36 (contact time) is reduced; the reasons for them will now be discussed. Before proceeding further, conventional problems should be clarified in the first place. Conventionally, as an arrangement with which the contact area is reduced, for example, collision prevention members are so formed as to have a tip end thereof formed into a spherical surface. However, so that no stain is produced on the optical disc owing to contact between the collision prevention members and the optical disc, it is preferable that the collision prevention members be formed of a material having wear resistance, and using such a material leads to increased difficulty in forming the collision prevention members as molded articles (e.g., forming the spherical surfaces as described above).

For this reason, conventionally, in a case where the collision prevention members are formed of a material having wear resistance, sheet members are made to adhere to the lens holder or the objective lens by a sticky material so that main surfaces of the sheet members (not side surfaces parallel to a thickness direction but surfaces wider than the side surfaces) face the information recording surface of the optical disc. With this arrangement, however, a limit is inconveniently imposed in processing the sheet members in length and width directions (L and W directions shown in FIG. 4), and consequently the contact area cannot be reduced further. In a case where ultra-high-molecular-weight-polyethylene is used as the sheet member, the processing limit is approximately 0.7 mm.

In this respect, in a case where the sheet members with which the collision prevention members 36 are formed as in this embodiment are formed of ultra-high-molecular weight-polyethylene, it is possible to make the sheet members approximately 0 2 mm in thickness in a thickness direction thereof. Accordingly, by arranging the collision prevention members 36 as in this embodiment, it is possible to reduce the contact area, differently from the collision prevention members using the conventional sheet members. In addition, the thickness direction d and the rotation direction of the optical disc 70 are substantially parallel to each other, thus making it possible to reduce the time for which the collision point on the optical disc 70 is in contact with the collision prevention members 36 (contact time) as compared with the conventional technique.

Although the contact area and contact time may be increased as compared with the collision prevention members formed as molded articles each having a tip end thereof formed into a spherical surface, the present invention makes it possible to use a material having wear resistance, and thus offers the advantage that the optical disc is hardly stained. That is, the arrangement in this embodiment advantageously makes it possible to reduce at the same time damages and stains produced on the optical disc.

Moreover, in this embodiment, the collision prevention members 36 are formed as the sheet members, and are inserted in the fixing portions 37 and securely fixed thereto by the adhesive agent. This eliminates the need for a sticky material as conventionally practiced. Accordingly, height management is easily performed on the collision prevention members 36, leading to improved operability and cost. Furthermore, the collision prevention members 36 are formed in the sheet form, leading to improved workability and cost.

The embodiment described herein is illustrative only, and the optical pickup device embodying the present invention is not limited to the embodiment specifically described above. Therefore various kinds of changes can be made without departing from the purpose of the present invention.

For example, although the above-described embodiment deals with the arrangement in which the two collision prevention members 36 are disposed, this is not meant to limit how the prevent invention is practiced. That is, the number of the collision prevention member 36 may be one or may be more than two. Moreover, the positions of the collision prevention members 36 on the lens holder 32 may be changed as necessary. It should be however noted that the number of the collision prevention member 36 should be even, and that preferably the collision prevention members 36 are arranged substantially symmetrically relative to a center of the object lens or the lens holder. With this design, it is possible to reduce a possibility that the lens holder 32 may be inclined owing to collision between the collision prevention members 36 and the optical disc 70, and that, for example, the optical disc 70 and the objective lens 17 or the like may make contact with each other accordingly.

Moreover, in the embodiment described above, the thickness direction d of the collision prevention members 36 and the rotation direction of the optical disc 70 are so arranged as to be substantially parallel to each other. This arrangement is preferred but the two directions are not necessarily in the relationship substantially parallel to each other.

Figure 8:
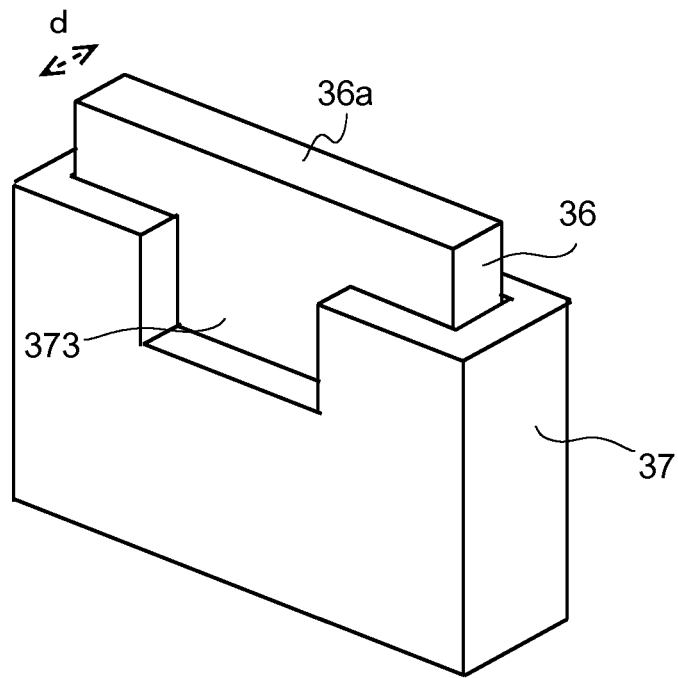
FIG. 8 shows a modified example of the fixing portion embodying the present invention.

Moreover in the embodiment described above, from the viewpoint of improved operability, the cutout slot 373 is formed in each of the fixing portions 37 from one end thereof to the other end thereof. However, for example, as shown in FIG. 8, the cutout slot 373 may be so formed as not to extend from one end thereof to the other end thereof. In addition, the fixing portions 37 can be formed in various kinds of shape, and may be constructed in any other way so long as the fixing portions 37 are capable of fixedly mounting the sheet-formed collision prevention members 36.

Figure 9:
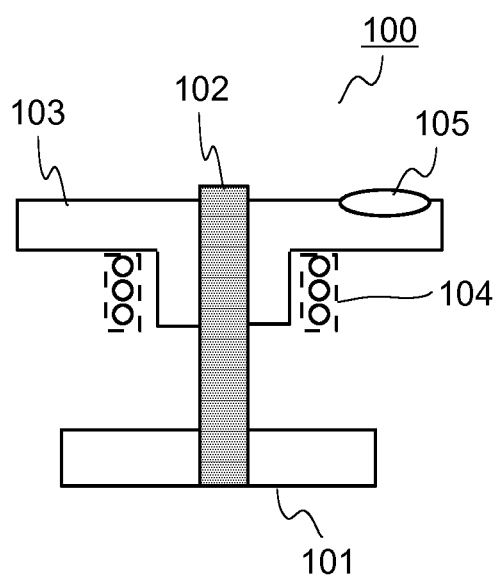
FIG. 9 shows a modified example of the objective lens actuator embodying the present invention.

Moreover, although the embodiment described above deals with the arrangement in which the objective lens actuator 3 is arranged so that the lens holder 32 is supported by the wires 34, and is moved as the wires 34 are moved (objective lens actuator of wire-supporting type), this is not meant to limit how the objective lens actuator is arranged. For example, as shown in FIG. 9, the objective lens actuator 100 may be of a shaft-sliding type or the like. In this case, by providing the collision prevention members having the same arrangement as in the embodiment described above, it is possible to offer the same workings and benefits.

The objective lens actuator 100 shown in FIG. 9 is provided with: a base 101; a sliding shaft 102; a lens holder 103 holding an objective lens 105; and a focusing coil 104. In this objective lens actuator 100, with electromagnetic effect between a magnetic field formed by unillustrated permanent magnets and electric current passing through the focusing coil, a force is produced in a direction parallel to a longitudinal direction of the sliding shaft 102 whereby the lens holder 103 is made to slide along the sliding shaft 102 so as to perform the focus adjustment.

In addition, although the embodiment described above deals with the optical pickup device compatible with one kind of optical disc, the present invention, as a matter of fact, can be applied to an optical pickup device compatible with plural kinds of optical discs (including those provided with a lens holder on which a plurality of objective lenses are mounted). Needless to say, the kind of optical disc is not limited to those mentioned in the embodiment described above.

With the optical pickup device embodying the present invention, it is possible to prevent collision between the objective lens and the optical recording medium, by use of the collision prevention member. Moreover, even if the collision prevention member and the optical recording medium collide with each other, the optical recording medium is less likely to be damaged and stained thereby. Furthermore, it is possible to fabricate such the collision prevention member at low cost. Therefore the present invention is a technique suitable for the optical pickup device.

What is claimed is:

1. An optical pickup device comprising:
    a light source;
    an objective lens focusing light from the light source on an information recording surface of an optical recording medium;
    a lens holder holding the objective lens; and
    a collision prevention member provided on the lens holder and preventing collision between the objective lens and the optical recording medium;
        wherein the collision prevention member is formed with a sheet member in a rectangular parallelepiped shape, and is disposed on the lens holder so that a side surface, substantially parallel to a thickness direction, of the sheet member faces the information recording medium
        wherein the lens holder is formed with a fixing portion including
            an insertion hole in a rectangular parallelepiped shape for inserting and firmly fitting the collision prevention member therein and
            a cutout portion for adhering and securely fixing the collision prevention member in the insertion hole, and
        wherein the cutout portion is formed by cutting out part of a side wall surrounding the insertion hole.

2. The optical pickup device according to claim 1, wherein the collision prevention member is disposed on the lens holder so that the thickness direction thereof is substantially parallel to a rotation direction of the optical recording medium, relative to a position at which the collision prevention member is disposed.

3. The optical pickup according to claim 1, wherein the adhering and secure fixing is achieved by use of adhesive injected in a lower portion of the cutout portion.

* * * * *